July 28, 1953  W. R. KROMER  2,646,667
METHOD OF AND APPARATUS FOR STORING, COOLING, AND
DISPENSING BEVERAGES
Filed Oct. 15, 1949  2 Sheets-Sheet 1

Fig. 1

INVENTOR
Wallace R. Kromer
BY Evans + McCoy
ATTORNEYS

July 28, 1953 W. R. KROMER 2,646,667
METHOD OF AND APPARATUS FOR STORING, COOLING, AND
DISPENSING BEVERAGES
Filed Oct. 15, 1949 2 Sheets-Sheet 2

INVENTOR
*Wallace R. Kromer*
BY *Evans & McCoy*
ATTORNEYS

UNITED STATES PATENT OFFICE 2,646,667

METHOD OF AND APPARATUS FOR STORING, COOLING, AND DISPENSING BEVERAGES

Wallace R. Kromer, Cleveland Heights, Ohio

Application October 15, 1949, Serial No. 121,606

18 Claims. (Cl. 62—116)

This invention relates to an improved method of and apparatus for storing, cooling, and dispensing beverage; the invention being especially useful and having particular utility in connection with carbonated beverages such as beer, ale, and the like. Reference is made to copending application for patent Serial No. 741,827, filed April 16, 1947, now Patent 2,485,610, dated October 25, 1949, of which this is a continuation in part. The present invention, in certain respects, being concerned with improvements on the earlier disclosure.

Beverages of the character mentioned are stored and dispensed under conditions which are dependent upon the facilities, arrangement and business volume of the particular tavern or other establishment concerned. Systems must sometimes be installed so that the kegs or containers of beverage are stored as in a pre-cooler and placed on tap at a considerable distance from the dispensing bar or faucet. Other installations require that the kegs or containers be stored and placed on tap relatively close or even directly under or alongside the dispensing bar which carries the faucets. Utilization of a jacket for immersing the beverage lines in a circulating liquid coolant, and thereby refrigerating beverage flowing through the lines as disclosed in the copending case referred to, is of principal advantage when the distance between the pre-cooler and the dispensing bar is considerable so as to subject beverage flowing through the conduits or lines to the chilling action of the circulating coolant in the casing sufficiently long for adequate cooling. In other situations, however, as when only a relatively short run of the beverage line can be immersed in the circulating liquid coolant, or when relatively large quantities of beverage are withdrawn from the system in short periods of time prior cooling systems have not proved entirely satisfactory.

It is therefore one of the principal objects of the present invention to provide a beverage storing, cooling, and dispensing method and system or apparatus in which the beverage is conducted over a series of paths, in one the beverage being maintained in direct heat exchanging relation with respect to a body of volatile liquid refrigerant and in another the beverage being maintained in direct heat exchanging relation with respect to a body of circulating coolant. As a preferential arrangement and as a further object of the invention it is sought to provide a system in which the beverage is stored under pressure in receptacles and in a refrigerated atmosphere, the beverage being carried thence through conduits to a dispensing bar having the usual faucets or taps. Between each receptacle and the faucet associated therewith, the connecting conduit includes a primary cooling portion or heat exchange element immersed in a bath of volatile liquid refrigerant which latter is so controlled as to rapidly chill the beverage by evaporation of the refrigerant. Each beverage line or conduit also includes a secondary cooling portion surrounded by or immersed in a bath of circulating coolant such as by being carried through a conduit through which chilled water is circulated. The path of the beverage through the conduit preferably leads first through the heat exchange element immersed in the volatile liquid refrigerant and then through the conduit portion immersed in the bath or body of circulating liquid coolant.

Another object is to provide beverage storing and cooling apparatus of the pre-cooler type in which a single refrigerating unit is arranged to cool both the cabinet pre-cooler and the beverage lines that connect the kegs or containers in the pre-cooler to the faucets or taps of a dispensing bar external to such pre-cooler. An important aspect of this phase of the invention is the arrangement whereby a single body of volatile liquid refrigerant confined as in a cooling unit receptacle or unit chills the beverage lines directly, chills liquid coolant circulated in heat exchanging relation with the atmosphere of the pre-cooler to maintain the latter within the desired temperature limitation. By such plural use of a single refrigerating body, considerable economy and design simplicity are effected in the matter of controls as well as other components.

A further object is to provide an improved method of chilling beverage in which the beverage is withdrawn from a storage body in the form of a flowing stream. The stream is first subjected to a rapid chilling, positively and quickly to reduce it to the desired dispensing temperature, and is thereafter maintained in direct heat conducting relation with respect to a circulating liquid coolant while traveling from the rapid cooling zone to the dispensing zone to stabilize the temperature of the beverage and to minimize excessive temperature fluctuations during such travel.

Still further objects and advantages which pertain to certain useful and novel features of construction and combinations and arrangements of parts, will become apparent from the following detailed description of the invention made in connection with the accompanying drawings, forming a part of the specification. Like parts throughout the several views are indicated by the same letters and numerals of reference.

Figure 1:
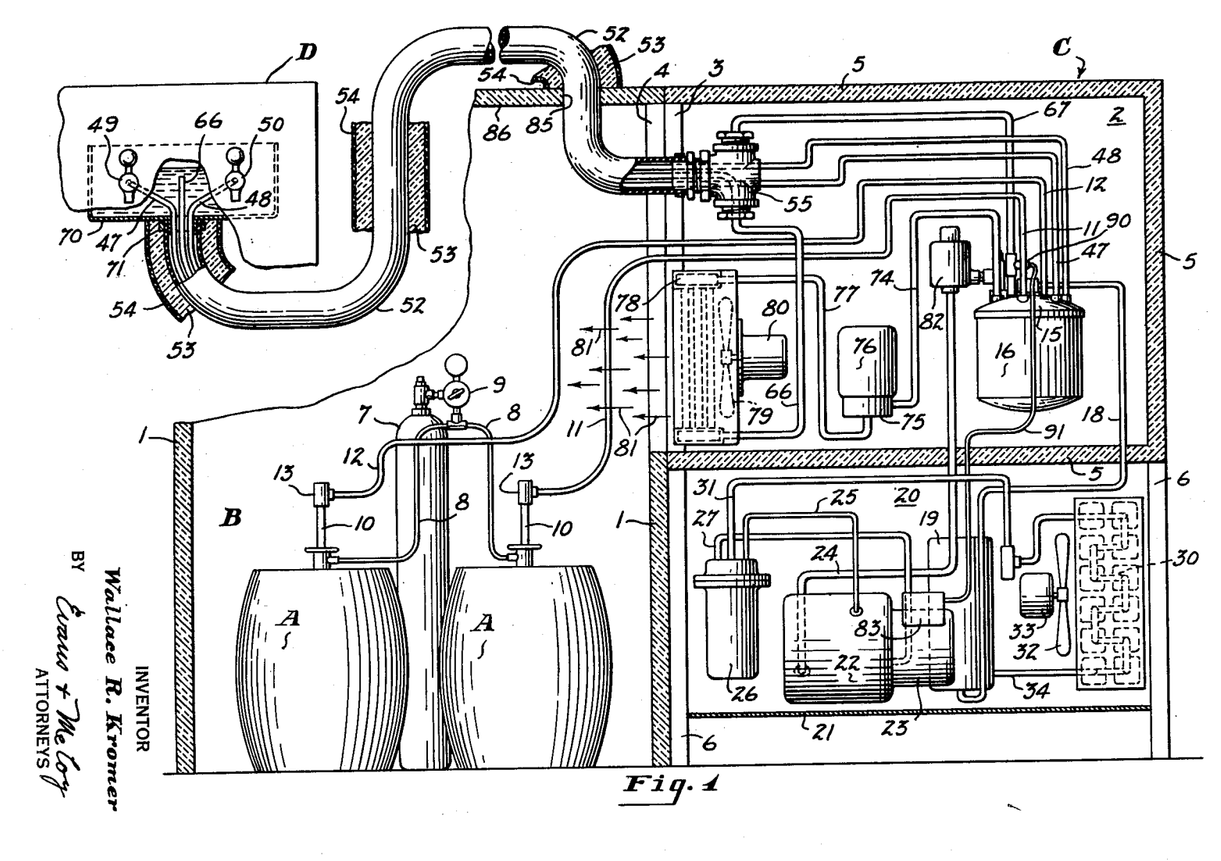
Figure 1 is a sectional view, partly diagrammatic and with parts broken away and removed, through a beverage storing, cooling, and dispensing system, illustrative of and incorporating the principles of the present invention.

In the illustrated system for storing, cooling, and dispensing beverage, the components are, in general, represented diagrammatically, for the reason that, except where structure is specifically described and illustrated, the invention is concerned with the combinations involved rather than with the structural details of the individual parts and components. Beverage receptacles or kegs A used in storing and transporting beverages such as beer, ale, and the like, are completely enclosed in and surrounded by a pre-cooler cabinet or storage room B so as to be contained in a confined atmosphere which, as will be later described, is chilled or refrigerated. The pre-cooler B desirably has insulated walls 1 and doors, not shown, are provided for access to the interior of the pre-cooler. The containers A are removed through such doors when they are spent, and replaced by fresh kegs or containers.

Alongside and in close juxtaposition to the pre-cooler B is a cooling unit C, this unit preferably being free standing and positioned directly against but on the outside of one of the pre-cooler walls. An insulated chamber 2 in the upper portion of the cooling unit is in direct communication with the interior of the pre-cooler B through aligned openings 3 and 4 in the cooling unit and pre-cooler, respectively, the joint between the openings being sealed. The cooling unit chamber 2 has insulated walls 5 supported as by uprights of legs 6, the openings 3 and 4 preferably being at or adjacent the tops of the pre-cooler and cooling unit.

The beer or other beverage is maintained under pressure in the containers A as by means of a carbon dioxide pressure tank 7 which is in communication with the containers through conduits 8, the gas pressure in the spaces over the beverages in the several containers being maintained at or only slightly above the balance pressure of the carbon dioxide charged beverage by a pressure regulating valve or valves 9 in the conduits 8. In a preferred arrangement the tap rods 10 and the carbon dioxide pressure regulating valve 9 are replaced by an automatic pressure regulating valve and tap rod assembly or unit such as that disclosed in Patent 2,335,595, dated November 30, 1943, and entitled "Beverage Dispenser." In such an arrangement the automatic pressure regulating valves carried by the tap rods receive carbon dioxide from the supply tank 7 at relatively high pressure and admit such gas into the space above the beverage in each of the kegs or containers A in accordance with requirements of the brewed or carbonated beverage as determined by the temperature of such beverage so as to maintain the carbon dioxide gas pressure in each particular keg equivalent to or slightly above the balance pressure of the beverage contained in each such keg.

The tap rods extend into the kegs or containers A through the usual pressure fittings and reach to adjacent the bottoms of the containers. The internal pressure maintained within each of the beverage containers forces the beverage through the tap rods and into separate flexible conduits 11 and 12, one for each container on tap. These conduits are connected to the upper ends of the tap rods as by valved fittings 13. The flexible beverage conduits 11 and 12 extend through the openings 3 and 4 in the cooling unit and pre-cooler cabinet and into the insulated chamber 2 of the cooling unit. The conduit ends are connected by threaded collars 14 to the inlets of cooling elements or coils contained in a receptacle or evaporator 16. This evaporator is of the constant pressure boil-off type which receives liquid refrigerant through a supply conduit 18 connected to the outlet of a refrigerant receiver 19. Refrigerant is fed into the receiver from a conventional refrigerant compressor unit and related parts housed in a chamber 20 in the bottom of the cooling unit C. Although only two containers or kegs are shown on tap, any desired number may be used, additional conduits corresponding to the conduits 11 and 12 being provided.

Floor 21 of the compressor chamber 20 is supported at its four corners by the frame uprights or legs 6 of the cooling unit. Reinforcing bars and cross members are omitted from the drawings for simplicity. The compressor unit in the chamber 20 includes a pump 22 driven by electric motor 23. Gaseous refrigerant from the evaporator 16 flows to the pump inlet through a conduit 24 and the compressed refrigerant is discharged from the pump 22 through a conduit 25 which leads into an oil separator 26. Oil is returned to the pump 22 from the separator through a conduit 27 and the refrigerant is carried to a condenser coil or heat exchanging radiator 30 through a conduit 31. Suitable vents or openings are provided in the walls of the compressor chamber 29 for the flow of cooling air over the coils of the refrigerant condenser 30. The air flow is induced by a fan 32 driven by electric motor 33 connected in parallel with the compressor drive motor. From the lower end of the condenser 30 the cooled liquid refrigerant flows through a conduit 34 into the storage or supply receiver 19 to which the conduit 18 from the evaporator 16 is connected.

Figures 2, 3, 4, 5, 6:
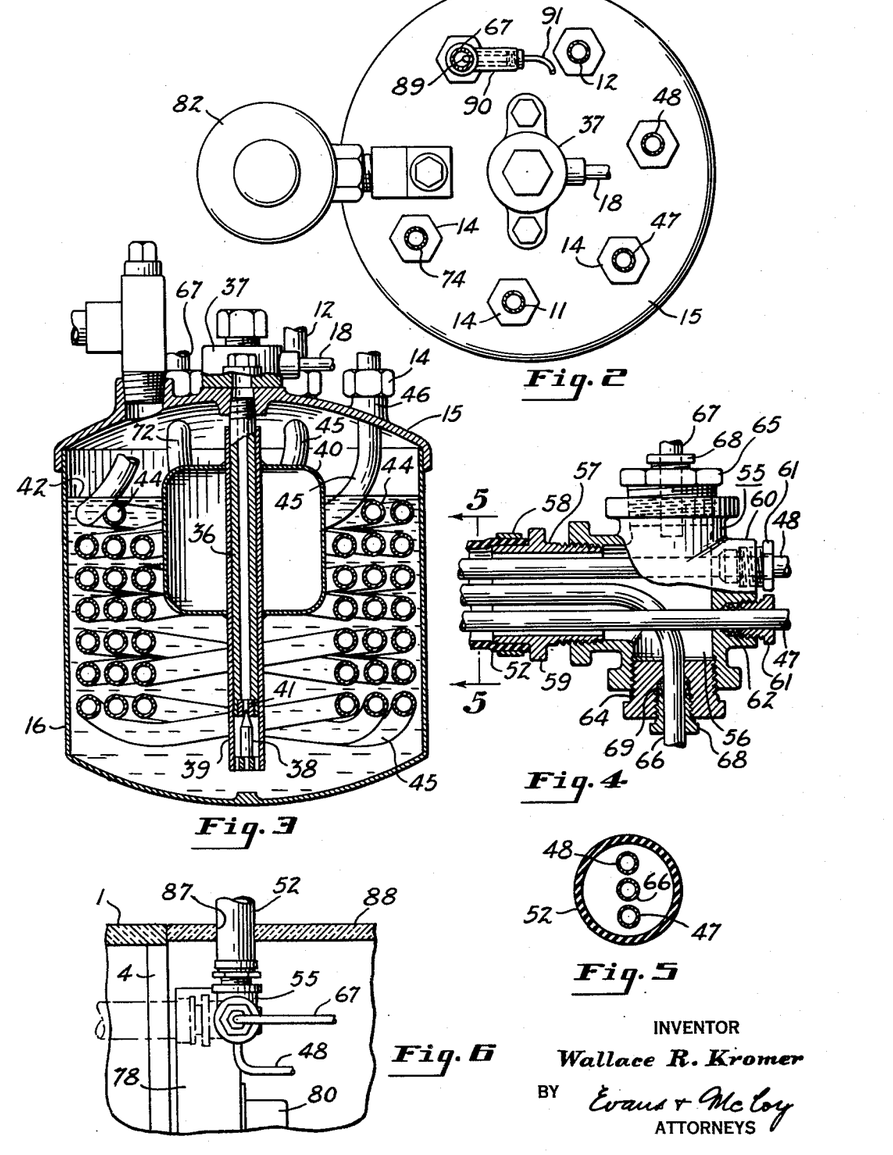
Fig. 2 is a plan view of the primary heat exchange unit or receptacle of the apparatus, with parts removed.
Fig. 3 is a vertical section, with parts broken away and removed, through the receptacle or heat exchanger shown in Fig. 2.
Fig. 4 is a fragmentary elevational detail showing the conduit manifold employed in the apparatus of Fig. 1 and enlarged with respect to that figure.
Fig. 5 is a transverse sectional detail through the conductor sheath, taken substantially along the line indicated at 5—5 of Fig. 4.
Fig. 6 is a fragmentary sectional detail showing a modification of the invention.

Extending downwardly from the center of the evaporator top 15 and through the center of the evaporator receptacle 16 is a rigid pipe or tube 36, Fig. 3, the upper end of the tube being threaded into a socket in the underside of the receptacle top. This pipe communicates through an external fitting 37 with the refrigerant supply conduit 18, the latter being connected to the fitting 37 as by a compression fitting. The flow of liquid refrigerant into the receptacle 16 through the central passage in the tube 36 is governed by a needle valve 38 carried by a perforated plug or spider in the lower end of a sleeve 39 that slidingly embraces the tube 36. A hollow sheet metal float 40, of circular form, is disposed embracingly about the sleeve 39 in concentric relation, and is secured thereto so as to actuate the needle valve. Liquid refrigerant rising in the internal chamber of the evaporator 16 lifts the float 40 and brings the needle valve 38 into sealing engagement against a circular seat element 41 press fitted into the lower end of the tube 36, thus shutting off the flow of liquid refrigerant into the evaporator. As the level of the liquid refrigerant drops or recedes, as by boil-off, the needle valve 38 moves away from the seat 31, permitting additional liquid refrigerant to enter the receptacle, thus maintaining the liquid refrigerant substantially at a constant level such as indicated at line 42.

Within the evaporator tank 16 are cooling coils or elements 44 and 45 to which the beverage conduits 11 and 12 are respectively connected. The cooling coils are nested so as to be immersed in the liquid refrigerant and the ends of the coils extend upwardly and are received snugly in downwardly opening internal bores formed in bosses 46 to the upper or outside ends of which the threaded collars 14 are secured. The coil ends are brazed or soldered in place to provide fluid tight connections. Beverage conduits or lines 47 and 48 are connected to the outlet ends of the cooling elements 44 and 45, respectively, as by means of the threaded collars 14. These beverage conduits are flexible tubes of metal or plastic material and extend to a dispensing unit D which is external to but may be either adjacent to or remote from the pre-cooler and cooling unit. The dispensing unit carries faucets 49 and 50 to which the beverage conduits 47 and 48 are respectively connected.

In passing through the cooling elements or coils 44 and 45 of the evaporator, beverage is quickly brought or cooled to the desired dispensing temperature, as will later appear, and it is most desirable that in its travel from the evaporator or cooler to the faucets 49 and 50, no objectionable temperature change or increase occur in the beverage. As one of the principal features of the present invention, therefore, there is provided in combination with the evaporator cooler unit 16, a temperature stabilizing device which comprises a liquid coolant filled conduit 52 that surrounds the beverage lines or conduits 47 and 48 from within the insulated chamber 2 of the cooling unit substantially to the faucets 49 and 50. Although in some applications or installations the stabilizing conduit may be of rigid material, suitably insulated, it preferably takes the form of a flexible sheath such as a fabric reinforced rubber hose. The rubber has an insulating effect which reduces the absorption of heat through the walls of the coolant conduit and the flexibility of the rubber hose facilitates installation of the system because of the ease with which the coolant conduit may be bent or otherwise made to follow the contours of rooms and passages through which it may extend between the cooling unit C and the dispensing unit D. In certain installations, as, for example, when the beverage lines are to pass through a relatively high temperature zone, the conduit 52 may be additionally insulated as by being embedded in a wrapping or casing of rockwool 53 or other insulating material held in place as by a canvas tube or sheath 54. The rockwool 53 and the retaining sheath or envelope 54 may be used over only such portion of the length of the coolant conduit 52 as is necessary but preferably extends over the entire length of that portion of the conduit which is external to the cooling unit, pre-cooler, and dispensing unit.

Within the insulated chamber 2 of the cooling unit the end of the coolant conduit 52 is fitted with a head or manifold 55 through which the beverage lines 47 and 48 are led into the temperature stabilizing conduit. The manifold is in the form of a hollow cast metal body having a plurality of threaded openings communicating with a common internal chamber 56. Into one of the openings is threaded one end of a tubular ferrule 57. The other end of the ferrule is received within the end of the coolant conduit 52, the conduit end abutting against a circumferential flange 59 on the ferrule and being embraced by a clamp 58 which causes the conduit to grip the ferrule and provide a fluid tight connection between the parts.

The beverage conduits or lines 47 and 48 extend through openings in a boss 60, the openings being aligned with the passage through the ferrule 57 to facilitate threading of the beverage conduits through the stabilizing coolant conduit 52 in assembly. Collars 61 embrace the beverage conduits 47 and 48 and are threaded into counter-bores in the manifold boss 60 to bear against packing 62. Lateral openings in the manifold 55 threadedly receive apertured plugs 64 and 65 which provide passages for supply and return conduits 67 and 66, respectively, through which cooling liquid flows to and from the temperature stabilizing conduit and the pre-cooler heat exchanger to be later described. Fluid tight joints comprising threaded collars 68 and packings 69 are carried by the plugs 64 and 65 to prevent the loss of cooling liquid from the manifold where the conduits 66 and 67 enter the latter.

The cooling liquid return and supply conduits 66 and 67 may comprise metal tubes or rubber or plastic hoses. The return conduit 66 extends longitudinally through the full length of the coolant or stabilizer conduit 52 and into a tank or expansion receptacle 70 comprising an element of the dispensing unit D. The end of the cooling liquid conduit 52 remote from the cooling unit C is connected to a tubular connector fitting on the bottom of the tank 70, being held in place as by circular collar or clamp 71. The beverage conduits 47 and 48 thus enter the tank through the bottom and are immersed in the body of liquid contained in the tank, the shanks of the faucets 49 and 50 being extended into the tank 70 below the surface level of the cooling liquid for connection thereto of the beverage conduits 47 and 48 also below such liquid level.

Cooling liquid such as water fills the space about the conduits 47, 48 and 66 within the conduit 52 and is continuous into the tank 70, the conduits thus being completely immersed, or substantially so, in the cooling liquid from the manifold 55 to the faucets. Cooling liquid supplied to the heat exchange conduit 52 and the tank 70 through the inlet conduit 67 flows first through the full length of the conduit 52, then into and through the tank 70, returning to the cooling unit C through the rubber conduit 66. The flow of the coolant in the conduit 52 being thus parallel to or in the same direction as the flow of beverage through the conduits 47 and 48 permits efficient and accurate temperature stabilization. At the manifold end of the cooling liquid conduit, the cooling liquid is withdrawn through the outlet conduit 66 and passes into a heat exchanger 78. This heat exchanger, which may comprise a tube formed into a coil or grid, is supported across the lower portion of the openings 3 and 4 between the pre-cooler chamber and the insulated chamber 2 of the cooling unit.

The heat exchanger is disposed wholly within the cooling unit C so that air forced between the coils or through the grid of the heat exchanger, as by fan 79 driven by electric motor 80 either intermittently or continuously, preferably the latter, is positively drawn from the atmosphere of the chamber 2. The fan 79 is so shaped and rotated that it blows air in the direction indicated by arrows 81 into the pre-cooler chamber. Circulation of air between the pre-cooler and the cooling unit is thus induced; air entering the pre-cooler from the cooling unit through the heat exchanger 78 and returning to the insulated chamber 2 through that area or areas of the aligned openings 3 and 4 which is on the outside of and chiefly above the heat exchanger 78. Air thus returning to the cooling unit chamber 2 flows over the metal manifold 55, over exposed portions of the beverage conduits 47 and 48, and over the outside surfaces of the evaporator 16 prior to being returned to the pre-cooler through the heat exchanger 78. In this manner, efficient cooling and temperature stabilizing effect is provided for all parts of the beverage circulating system and effective utilization of the single refrigerant evaporator of the cooling apparatus is obtained. From the atmospheric heat exchanger 78, cooling liquid flows through a connecting conduit 77 to the inlet of a circulating pump 75. This pump, driven continuously as by an electric motor 76 to which it is coupled, forces the received liquid through a return connecting conduit 74 and through a cooling coil or element 72 to which the return conduit 74 connects and which is nested with the coils 44 and 45 in the evaporator receptacle or tank 16.

The coil 72, made of metal tubing similar to that employed for the coils 44 and 45, has its ends projecting upwardly into sockets formed in bosses in the evaporator top 15; the tube ends being brazed or soldered in place to provide fluid tight joints. The external conduits 67 and 74 are connected to the bosses as by means of threaded collars 14 such as previously mentioned.

After circulating through the grid or coil of the heat exchanger 78, the cooling liquid is forced by the pump 75 to flow from the bottom of the heat exchanger through the conduit 66 which, as previously explained, extends through a gland in the manifold 55 and carries the liquid through the rubber conduit 52 and into the tank 70.

The supply of liquid refrigerant to the evaporator 16 is controlled by the needle valve 38 governed by the float 40 which is set to maintain the refrigerant at some such level as that indicated at 42. The refrigerant employed may be any of the conventional low boiling point liquids such as dichlorodifluoro methane, ammonia, or sulfur dioxide, the temperature within the evaporator 16 being governed and maintained between about 36° and about 40° Fahrenheit, as by a thermal responsive switch 83 and a constant pressure valve 82. The switch 83 is responsive to the pressure of a fluid medium in a bulb 89, the latter being inserted into the coolant supply line or conduit 67 as by means of a T fitting 90 and being connected to the switch by relatively small diameter tubing 91 known as capillary tubing. The switch receives electrical current from a suitable source and governs the supply of such current to the motor 23. Thus the switch operates to start and stop the compressor drive motor so as to withdraw gaseous refrigerant from the evaporator 16 through the conduit 24 and, as regulated by the valve 82, maintain a predetermined pressure within the evaporator. The pressure controlling valve 82 is disposed in the gaseous refrigerant return conduit 24 and maintains the pressure in the evaporator 16 within predetermined limits, the valve being set to permit the return of gaseous refrigerant to the compressor when the pressure (and corresponding temperature) within the evaporator rises above a predetermined value and to close the refrigerant return conduit when the gaseous pressure (and corresponding temperature) within the evaporator falls below a predetermined value. By thus governing the compressor 22 through a thermal device (bulb 89—switch 83) responsive to the temperature of the continuously circulating liquid coolant at a point of the circuit closely adjacent the outlet of the coolant from the evaporator, it is possible to obtain effective cooling and temperature stabilization of the beverage with minimum starting and stopping of the compressor.

To obtain optimum efficiency the manifold 55 is positioned within the insulated chamber 2 of the cooling unit. In Figure 1 the stabilizing or cooling conduit 52 extends through the cabinet openings 3 and 4 into the interior of the pre-cooler 1. The conduit and the beverage lines enclosed therein then extend through an opening 85 in top 86 of the pre-cooler from whence the conduit extends to the dispenser D. In certain instances the dispenser D may be positioned directly above or even supported upon the top 86 of the pre-cooler. Thus a close coupled installation is possible employing a relatively short temperature stabilizing or coolant conduit 52.

For use in installations requiring the cooling liquid conduit 52 to be carried horizontally, the manifold 55 may be rotated or turned 90° as illustrated in Fig. 6. The broken lines in this figure represent the position of the manifold and cooling liquid conduit corresponding to Figure 1 and the full lines indicate the positions of the corresponding parts in their rotated or shifted positions. In this arrangement the cooling liquid conduit 52 extends through an opening 87 in wall 88 of the cooling unit C.

In the storing, cooling and dispensing of beverage in accordance with the method of the present invention and by means of the apparatus described, advantage is taken of the cooling characteristics of volatile refrigerant to obtain a more uniform, rapid, and efficient cooling of the beverage. In conventional systems of the so-called chilled or refrigerated conduit type, such as disclosed in my copending application referred to, the beverage lines or conduits extending between the transportation kegs or containers and the faucets of the dispensing bar are immersed in a liquid cooling medium such as water or brine. The heat transfer from beverage flowing in a beverage tube or line to liquid coolant (as distinguished from volatile refrigerant) surrounding such beverage line is limited by the sensible heat absorbing capacity of the coolant and the convection currents induced or set up in the coolant. Accordingly the conventional chilled conduit system requires either a relatively long beverage tube or line or a beverage tube of relatively small cross section. Long beverage lines are objectionable because of cost, installation difficulty, and cleaning and maintenance difficulties.

Systems utilizing relatively small beverage tubes, such for example as $\frac{5}{16}''$ diameter or less, require the use of relatively high gas pressure in the keg or transportation container in order to overcome the resistance to flow or restriction in the beverage conduit resulting from the small cross sectional area of the latter. In order to obtain adequate flow volume through the dispensing faucet conventional chilled conduit systems using small cross sectional area beverage lines frequently require keg pressures in excess of thirty-five pounds per square inch. A beverage such as beer or ale normally has a carbon dioxide content requiring or producing in the keg from about fourteen to about eighteen pounds pressure at a temperature of about 45° to about 50° Fahrenheit. Hence it is not desirable to utilize carbon dioxide gas alone to establish the high pressure required in conventional chilled conduit dispensing systems—to do so would result in overcarbonization of the beverage. As an alternative, high pressure air is customarily introduced into the keg to provide the necessary keg pressure which, as mentioned above, may be as high as about thirty-five pounds. But the use of air over the beverage in the keg is unsatisfactory because of the introduction into the keg of air containing objectionable odors or contaminated with bacteria, or both.

The method and apparatus of the present invention largely overcomes the difficulties of and objections to conventional chilled beverage line systems by utilization of the latent heat of vaporization of a volatile refrigerant in the absorption of heat from the beverage being cooled and by conducting the cooled beverage from the point of cooling to the point of dispensing through a conduit surrounded by a medium maintained at the desired dispensing temperature. Normally, substantially the entire drop in the temperature of the beverage from the keg or transportation container to the dispensing faucet occurs in or during the travel of the beverage through the tubes or coils 44 and 45 within the evaporator receptacle or tank 16, the constant pressure valve 32 and the thermal switch 83 (as controlled by the bulb 89) being set or adjusted to maintain the volatile refrigerant in the evaporator 16 at about 38° Fahrenheit so as to cool the beverage and coolant to that temperature. The primary function of the liquid coolant in the conduit 52 is not to lower the beverage temperature but to maintain the beverage in the conduits 47 and 48 at the desired dispensing temperature after the beverage has been reduced to such temperature in its passage through the coils or conduits 44 and 45.

By utilization of volatile refrigerant as the direct acting cooling medium for absorbing heat in the beverage being cooled, a relatively high rate of heat transfer occurs through the walls of the conduits 44 and 45, the heat absorbed by the refrigerant causing vaporization or boiling off of the refrigerant. This direct use of the latent heat of vaporization of the volatile refrigerant in the cooling cycle of the beverage provides improved and more efficient cooling of such beverage. Accordingly, long beverage lines or tubes are not required nor are beverage tubes of small diameter or cross sectional areas necessary. It has been found satisfactory, for example, to make the beverage conduits 11 and 12 leading to the evaporator 16 and also the beverage conduits 47 and 48 extending between the evaporator and the dispensing faucets of circular sectioned tubing having an internal diameter of about $\frac{3}{8}''$. The tubular coils 44 and 45 in the evaporator 16 are formed of thin walled metal tubes of $\frac{3}{8}''$ internal diameter either round, as shown, or flattened or ovate in shape. The total length of each beverage line between the transportation container or keg A and the dispensing faucet 49 or 50 is not critical by reason of the fact that cooling of the beverage is primarily effected in the volatile refrigerant heat exchanger 16 and the relatively large cross section of each of the tubes comprising the line avoids objectionable throttling or restriction such as would require gas pressure in the keg greatly in excess of the balance pressure of the normal or brewed in carbon dioxide content of the beverage. Since the tubes 47 and 48 are not relied upon to cool the beverage, they can be of whatever length is convenient to the particular installation being made—in some instances being as short as about six feet or less in length—depending chiefly upon the distance between the pre-cooler B and the dispensing bar D.

Each of the tubular coils 44 and 45 immersed in the liquid volatile refrigerant contained in the evaporator 16 has a length preferably of from about eighteen to about thirty feet so that, in normal installation, the aggregate length of each one of the beverage lines is in the neighborhood of about twenty-eight to about forty feet. When the beverage lines are formed of tubes having an internal diameter of about $\frac{3}{8}''$ satisfactory operation results when maintaining a carbon dioxide or gas pressure of from about fourteen to about twenty-four pounds per square inch within the keg. The pressure variation results chiefly from fluctuations in the temperature of the beverage in the transportation containers A, depending usually upon how long they may have been stored in the pre-cooler B prior to tapping.

The relatively low gas pressure in the keg of the present apparatus and system permits advantageous use of automatic gas pressure regulating valves and tap rods such as shown in Patent 2,335,595 referred to above, although the use of such automatic valves is not essential to practice of all aspects of the present invention. Thus the present invention permits the use of carbon dioxide gas alone and in lieu of air in the space over the beverage in the transportation container or keg to force the beverage through the beverage line without objectionably overcharging or overcarbonating such beverage. Furthermore, besides eliminating the necessity for using high pressure air in the keg, contamination and aeration of the beverage is avoided. Low pressure drop or loss through the beverage lines of the present system permits the gas pressure maintained in the keg to be determined wholly by considerations of beverage quality, palatability and preservation rather than on any necessity for maintaining a relatively high pressure to force the beverage through the line.

The utilization of a circulating liquid coolant in the conduit 52 to maintain the chilled beverage at the desired dispensing temperature as it flows from the quick chilling evaporator 16 to the faucets 49 and 50 insures delivery of the beverage at the desired dispensing temperature for the reason that the circulating coolant is flowed through the tube 72 immersed in the same body of volatile liquid refrigerant that cools the beverage lines. Thus, except for variations resulting from heat absorption external to the evaporator 16, the liquid coolant in the conduit 52 is maintained substantially at the same temperature as beverage flowing through the tubes or lines 47 and 48.

At the dispenser end of the lines or tubes 47 and 48 the latter are connected to the faucets 49 and 50 below the surface of the liquid in the tank 70. Accordingly, beverage lines are wholly immersed in the circulating liquid coolant from the manifold 55 to the faucets on the dispensing bar. These faucets, having metal shanks that are immersed in the circulating liquid coolant, are maintained substantially at the desired dispensing temperature of the beverage and objectionable "faucet spit" resulting from warming of beverage in an unchilled faucet or portion of beverage line is eliminated.

By way of example, a dispensing apparatus for storing, cooling and serving beer was constructed in accordance with the description and disclosure above set forth. Such apparatus included beverage tubes or lines corresponding to the lines 11 and 12 having lengths of approximately five feet and seven feet respectively, such tubes being formed of extruded polyethylene and having internal diameters of approximately $\frac{3}{8}''$ each, with wall thickness about $\frac{3}{32}''$. The beverage conduits 47 and 48 were likewise each formed of the same size of polyethylene tubing mentioned, the entire length of each of the beverage tubes 47 and 48 from heat exchanger 16 to submerged faucets 49 and 50 being approximately eighteen feet. Flattened metal tubes of $\frac{3}{8}''$ internal diameter formed the heat exchanging elements 44 and 45 submerged in the volatile refrigerant and were each approximately twenty-eight feet in length. The refrigerant supplying apparatus including the constant pressure control valve 82 and the thermostatically controlled switch 83 were adjusted to maintain a body of liquid Freon in the evaporator 16 at a temperature of approximately 35° F. A tank containing carbon dioxide under pressure was connected to each of two kegs or "halves" of beer placed on tap on the lines 11 and 12. Tap rod assemblies including automatic pressure regulating valves of the type shown in Patent 2,335,595 were used to connect the carbon dioxide source to the kegs, these valves being adjusted to maintain gas pressure in the kegs approximately two pounds in excess of the balance pressure of the beer.

The apparatus just described was tested under varying conditions of beer temperature and of atmospheric or ambient air temperature in the building where the apparatus was set up and operated. The tests included the drawing of beer through the beverage tubes or lines continuously for various periods of time to determine the temperatures of the beverage flowing from the faucets or taps under different dispensing conditions. The results of the tests are set forth in the following table:

| Test No. | Beverage Line | Ambient Air Temp. in Build. | Beer Temp. in Keg | Circulat. Water Temp. | Pre-cooler Air Temp. | Beer Drawing Test Cycle | | Drawn Beer Temp. at Tap |
|---|---|---|---|---|---|---|---|---|
| | | | | | | Tap On | Tap Off | |
| | | Degrees | Degrees | Degrees | Degrees | Min. | Min. | Degrees |
| 1 | 11—47 | 84 | 50 | 36 | 43 | 3 | 3 | 38½ |
| | 12—48 | 81 | 51 | 37 | 44 | 4 | 3 | 39½ |
| 2 | 11—47 | 91 | 48 | 38 | 45 | 20 | 3 | 39 |
| | 12—48 | 94 | 48 | 37 | 44 | 30 | 3 | 39 |
| 3 | 11—47 | 88 | 46 | 36 | 43 | 4 | 4 | 38 |
| | 12—48 | 41 | 46 | 37 | 44 | 3 | 3 | 39 |
| 4 | 11—47 | 86 | 46 | 36 | 42 | 20 | 4 | 39 |
| | 12—48 | 87 | 47 | 36 | 44 | 20 | 4 | 39½ |
| 5 | 11—47 | 86 | 46 | 36 | 43 | 15 | 3 | 39 |
| | 12—48 | 88 | 46 | 36 | 44 | 20 | 4 | 39½ |

All temperatures observed were Fahrenheit, the temperature of the circulating water being taken in the dispenser tank 70 and the temperature of the drawn beer being taken at the faucets or taps 49 and 50.

The above tests, conducted over a period of several days to provide the different conditions mentioned, show that even under varying atmospheric temperatures and keg temperatures, the temperature of the beer as withdrawn from the taps remains substantially constant, varying only between about 38° and about 39½° Fahrenheit.

The present dispensing method and apparatus, wherein the beverage is reduced in temperature or cooled very rapidly to the desired dispensing temperature while passing through the heat exchanger 16 at a point close to the keg and remote from the dispensing bar, and thereafter is conducted to the bar faucets or taps over a course where heat transfer between the beverage and the surrounding medium is unnecessary, permits the use of beverage tubes having heat insulating characteristics. Polyethylene tubes, used for the beer lines 11, 12, 47 and 48 in the apparatus just described, have many desirable properties as beverage conductors for the reason that they are substantially inert and do not impart metallic or other objectionable flavor or odor to the beverage. Furthermore, the polyethylene tubes are non-porous, extremely smooth, and do not become soiled or contaminated by bacteria as much as conventional metal beverage tubes. The present apparatus, which thus permits the use of heat insulating polyethylene or other plastic tubes, is generally more sanitary than conventional dispensers and facilitates the serving of beer and similar beverages that are palatable and that retain the brewed-in flavor desired by both the manufacturer and the consumer.

In accordance with the patent statutes, the principles of the present invention may be utilized in various ways, numerous modifications and alterations being contemplated, substitution of parts and changes in construction being resorted to as desired, it being understood that the apparatus shown in the drawings and described above and the particular method set forth are given merely for purposes of explanation and illustration without intending to limit the scope of the claims to the specific details disclosed.

What I claim and desire to secure by Letters Patent of the United States is:

1. The method of storing and cooling beverage which comprises maintaining a body of beverage under pressure, withdrawing beverage from the body, as required, and passing the withdrawn beverage over a path immersed in a body of volatile liquid refrigerant maintained substantially within a predetermined pressure range and substantially within controlled temperature limits whereby the withdrawn beverage is quickly chilled by latent heat direct absorption by the refrigerant substantially to the controlled temperature of the volatile refrigerant, and thereafter conducting the chilled beverage away from the volatile refrigerant to a dispensing point over a path immersed in a circulating liquid maintained substantially at the desired dispensing temperature whereby to minimize temperature fluctuations in the beverage in its travel from the chilling path to the dispensing point.

2. In a beverage storing, cooling and dispensing system of the type having a dispensing unit and a pre-cooler, and employing transit containers in the pre-cooler with beverage conduits connecting the containers to the dispensing unit, the improvement which comprises a cooling unit for chilling the atmosphere of the pre-cooler and the beverage lines, said unit being disposed substantially wholly on the outside of the pre-cooler and including a refrigerant compressor unit and an evaporator, the pre-cooler and the cooling unit having registered openings with the evaporator disposed in the cooling unit for the circulation of air thereover and into and out of the pre-cooler through the registered openings, a cooling liquid conduit extending between the cooling unit and the dispensing unit and embracing the beverage lines, means for circulating a liquid coolant through the cooling conduit and in direct heat exchanging relationship to refrigerant in the evaporator, and means for circulating air in heat exchanging relation to refrigerant in the evaporator and through the pre-cooler.

3. In a beverage storing and dispensing system of the type having a dispensing unit and a pre-cooler room for beverage transit containers and beverage conduits extending between transit containers in the pre-cooler to the dispensing unit, the improvement which comprises the combination of a cooling liquid conduit for enclosing the beverage conduits and a cooling unit for cooling the pre-cooler and for supplying coolant to the cooling conduit to cool the beverage conduits, said cooling unit including a cabinet structure adapted to be disposed against the outside of the pre-cooler and having an opening to receive the beverage conduits, one end of the cooling conduit being disposed within the cooling unit, an evaporator for volatile liquid refrigerant in the cooling unit, and means for supplying liquid refrigerant to such an evaporator, the beverage conduits including heat exchange elements within the evaporator for immersion in liquid refrigerant therein, and means for circulating a liquid coolant through the cooling conduit and in direct heat exchange relation to liquid refrigerant in the evaporator.

4. In apparatus for storing, cooling, and dispensing beverage, the combination of a pre-cooler, a beverage container in the pre-cooler, a chiller, and a dispenser, the chiller comprising a receptacle for containing a body of volatile liquid refrigerant, means for maintaining liquid refrigerant in the receptacle under predetermined conditions of temperature and pressure, a plurality of heat exchange elements immersed in the refrigerant within the receptacle, conduit means for connecting one of the heat exchange elements to the beverage container in the pre-cooler, conduit means for connecting the one element to the dispenser, a tubular jacket enclosing a portion of the last named conduit, means connecting the tubular jacket to another heat exchange element in the receptacle for the circulation of liquid coolant between the jacket and the other refrigerating element, and means associated with the receptacle for cooling the pre-cooler.

5. In apparatus for storing, cooling, and dispensing beverage including a pre-cooling chamber for beverage storage containers, a dispensing faucet outside the chamber, and beverage conductor means for connecting the faucet to one of the storage containers, improved means for cooling the chamber and the beverage conductor means comprising an evaporator for liquid refrigerant, means for supplying refrigerant to the evaporator, a plurality of heat exchange elements associated with the evaporator and arranged in direct heat exchanging relation to refrigerant in the evaporator, said beverage conductor means being series connected with one of the heat exchange elements for conducting flowing beverage from one of the storage containers in direct heat exchanging relation to liquid refrigerant in the evaporator, conduit means for carrying liquid coolant over the beverage conductor means, conductor means connecting another of the heat exchange elements of the evaporator with the coolant conduit, a heat exchanger for cooling the atmosphere of the pre-cooling chamber, conductor means connecting said other of the heat exchange elements of the evaporator with the atmosphere heat exchanger, conductor means connecting the coolant conduit and the atmosphere heat exchanger for the serial flow of liquid coolant through said other heat exchange element, the coolant conduit and the atmosphere heat exchanger, and circulator means for inducing said serial flow of liquid coolant.

6. In apparatus for storing, cooling and dispensing beverage including a pre-cooling chamber for beverage storage containers, a dispensing faucet outside the chamber, and beverage conductor means for connecting the faucet to a storage container in the pre-cooler chamber, improved means for cooling the chamber and the beverage conductor means comprising an evaporator for liquid refrigerant, means for supplying refrigerant to the evaporator, a plurality of heat exchange elements associated with the evaporator and arranged in direct heat exchanging relation to refrigerant in the evaporator, said beverage conductor means being series connected to one of the heat exchange elements for conducting flowing beverage from a storage container in the pre-cooling chamber in direct heat exchanging relation to liquid refrigerant in the evaporator, conduit means and heat exchange means for carrying liquid coolant in heat exchange relation respectively with the beverage conductor means and the atmosphere of the pre-cooling chamber, conductor means connecting the conduit means and the atmosphere heat exchange means with at least one other heat exchange element of the evaporator, and means for inducing flow of liquid coolant through such other heat exchange element of the evaporator, the conduit means and the atmosphere heat exchange means.

7. In combination in a beverage storing and cooling system, means providing a pre-cooler having an insulated wall chamber for receiving beverage transit containers and storing the latter in a chilled atmosphere, the pre-cooler also having an opening in one wall thereof, a cooling unit disposed adjacent the pre-cooler and having an insulated chamber with an opening registered with the opening in the wall of the pre-cooler, an evaporator including a receptacle for liquid refrigerant in the cooling unit chamber, means external to the cooling unit chamber for supplying liquid refrigerant to the evaporator, a plurality of heat exchange elements disposed so as to be in direct heat exchanging relation to liquid refrigerant in the receptacle, beverage conductor means extending through the registered openings and connecting beverage transit containers in the pre-cooler individually to separate heat exchange elements of the evaporator, dispensing faucets external to the pre-cooler and the cooling unit, beverage conductor means connected to the heat exchange elements of the evaporator for carrying chilled beverage to the faucets, conduit means for conducting liquid coolant in heat exchange relation to the last named beverage conductor means, said heat exchange conduit extending between the insulated chamber of the cooling unit and the external dispensing faucets, a heat exchanger for cooling the atmosphere of the pre-cooler chamber, and means for circulating liquid coolant through at least one other heat exchange element of the evaporator, through the cooling conduit and through the atmosphere heat exchanger, whereby a single body of liquid refrigerant in the evaporator cools the atmosphere of the pre-cooler indirectly by means of liquid coolant circulated through the atmosphere heat exchanger, cools beverage flowing to the dispensing faucets indirectly by means of coolant flowing through the coolant conduit, and cools beverage received from transit containers by direct heat exchange as such beverage flows through the heat exchange elements of the evaporator.

8. The beverage cooling method which comprises flowing the beverage over successive paths, conducting a liquid of the volatile refrigerant type in direct heat exchanging relation to the beverage flowing in one of said successive paths, conducting another liquid in direct heat exchanging relation to the beverage flowing in another of said successive paths after such beverage has flowed over said one path, then conducting said other liquid in heat exchanging relation to the volatile refrigerant and recycling said other liquid in heat exchanging relation to beverage in said other of the successive paths.

9. The carbonated beverage storing, cooling and dispensing method which comprises maintaining a relatively large body of carbonated beverage under pressure sufficient substantially to retain in solution the natural carbon dioxide content of the beverage and under refrigeration in an atmosphere below a temperature of about 45° F., withdrawing beverage from the refrigerated and pressurized body as required, flowing the withdrawn beverage under pressure and over a wholly refrigerated course comprising successive paths substantially from said body substantially to the place of dispensing, conducting a liquid of the volatile refrigerant type in direct heat exchanging relation to the beverage flowing in one of said successive paths, conducting another liquid in direct heat exchanging relation to said volatile refrigerant and to the beverage flowing in another of said successive paths after such beverage has flowed over said one path, and recycling said other liquid in heat exchanging relation to beverage in said other of the successive paths.

10. In the method of storing, cooling and dispensing beverage in a system which comprises a container in which is maintained a body of the beverage available for use, a faucet for controlling the flow of beverage in the system and through which beverage is withdrawn for use as desired, and conduit means connected between the container and the faucet to provide a path over which the beverage flows in moving from the container to the faucet, the improvement which comprises maintaining a body of cooling liquid of the volatile refrigerant type in controlled heat exchanging relation to beverage in one portion of said path, flowing a liquid heat exchange medium in direct heat exchange relation to beverage in another portion of said path, and effecting a controlled heat transfer between the liquid medium and the body of volatile refrigerant to maintain the medium between predetermined temperature limits.

11. In the method of storing, cooling and dispensing beverage in a system which comprises a container in which is maintained a body of the beverage available for use, a faucet for controlling the flow of beverage in the system and through which beverage is withdrawn for use as desired, and conduit means connected between the container and the faucet to provide a path over which the beverage flows in moving from the container to the faucet, the improvement which comprises maintaining a body of cooling liquid of the volatile refrigerant type in controlled heat exchanging relation to beverage in one portion of said path relatively remote from the faucet, flowing a liquid heat exchange medium in direct heat exchange relation to beverage in another portion of the beverage path relatively close to the faucet and between the said remote portion of the beverage path and the faucet, and effecting a controlled heat transfer between the liquid medium and the body of volatile refrigerant to maintain the medium between predetermined temperature limits.

12. In the method of storing, cooling and dispensing beverage in a system which comprises a container in which is maintained a body of the beverage available for use, a faucet for controlling the flow of beverage in the system and through which beverage is withdrawn for use as desired, and conduit means connected between the container and the faucet to provide a path over which the beverage flows in moving from the container to the faucet, the improvement which comprises maintaining a body of cooling liquid of the volatile refrigerant type in controlled heat exchanging relation to beverage in one portion of said path, flowing a liquid heat exchange medium in direct heat exchange relation to beverage in another portion of said path, circulating air in heat exchange relation to the liquid medium and to the beverage container and thereby effecting a heat exchange between said heat exchange medium and beverage maintained in the container to cool the body of beverage, and effecting a controlled heat transfer between the liquid medium and the body of volatile refrigerant to maintain the medium between predetermined temperature limits.

13. The beverage cooling method which comprises maintaining a body of cooling liquid of the volatile refrigerant type in a cooling zone, flowing beverage over a series of successive paths one of which extends through said cooling zone wherein the flowing beverage is passed in direct heat exchanging relation to said body of liquid refrigerant, conducting another liquid over a closed path which includes one portion that substantially parallels another of said beverage paths and in which portion the said other liquid is in direct heat exchanging relation to beverage in the said other beverage path and which closed path includes another portion in the cooling zone in which other portion the said other liquid is in direct heat exchanging relation to said body of liquid refrigerant.

14. The beverage cooling method which comprises maintaining a body of cooling liquid of the volatile refrigerant type in a cooling zone, flowing beverage over a series of successive paths one of which extends through said cooling zone wherein the flowing beverage is passed in direct heat exchanging relation to said body of liquid refrigerant, flowing a liquid heat exchange medium over a course substantially paralleling another of said beverage paths in which course the liquid medium is in heat exchanging relation to beverage in the said other beverage path, and cooling the heat exchange medium by passing it through the cooling zone.

15. In a beverage storing, cooling and dispensing system of the type having a dispensing unit and a precooler, and employing a beverage container in the precooler with a beverage conduit connecting the beverage container to the dispensing unit, the improvement which comprises a cooling unit for chilling the atmosphere of the precooler and the beverage conduit, said cooling unit being disposed substantially on the outside of the precooler and including a refrigerant compressor unit and an evaporator, the precooler and the cooling unit having connected openings with the evaporator disposed in the cooling unit for the circulation of air thereover and into and out of the precooler through the connected openings, a cooling liquid conduit extending between the cooling unit and the dispensing unit, said cooling liquid conduit and said beverage conduit being arranged for the direct exchange of heat between beverage in the beverage conduit and liquid coolant in the cooling liquid conduit, means for circulating liquid coolant through the cooling conduit and in direct heat exchanging relation to refrigerant in the evaporator, and means for circulating air in heat exchanging relation to refrigerant in the evaporator and through the precooler.

16. In a beverage storing and dispensing system of the type having a dispensing unit, a precooler, a beverage container in the precooler, and a beverage conduit for connecting the beverage container to the dispensing unit, the improvement which comprises the combination of a tubular jacket enclosing one portion of the beverage conduit and a cooling unit for cooling the precooler and for supplying coolant to the tubular jacket to cool the one beverage conduit portion in the latter, said cooling unit including a cabinet structure disposed outside the precooler and having an opening communicating with the interior of the precooler to receive another portion of the beverage conduit, one end of the tubular jacket being disposed within the cooling unit, an evaporator for volatile liquid refrigerant in the cooling unit, means for supplying liquid refrigerant to said evaporator, the beverage conduit including an element associated with the evaporator for direct exchange of heat between liquid refrigerant in the evaporator and beverage in said element of the beverage conduit, and means for circulating a liquid cooling medium through the tubular jacket for heat exchange between beverage in said one beverage conduit portion and the liquid cooling medium and through the evaporator for direct heat exchange between the cooling medium and liquid refrigerant in the evaporator.

17. In apparatus for storing, cooling and dispensing beverage the combination of a precooler, a beverage container in the precooler, a chiller, and a dispenser, the chiller comprising an evaporator for receiving refrigerant of the volatile liquid type, means for maintaining liquid refrigerant in the evaporator under predetermined conditions of temperature and pressure, a plurality of heat exchange elements associated with the evaporator for direct exchange of heat between such elements and liquid refrigerant in the evaporator, conduit means connecting one of the heat exchange elements to the beverage container in the precooler, conduit means connecting said one heat exchange element to the dispenser, a tubular jacket enclosing a portion of the last named conduit means, means connecting the tubular jacket to another of said heat exchange elements associated with the evaporator for the circulation of liquid coolant through the tubular jacket and said other heat exchange element, and means associated with the evaporator for cooling the precooler.

18. The carbonated beverage storing, cooling and dispensing method which comprises maintaining a relatively large body of carbonated beverage under pressure sufficient to retain in solution the natural carbon dioxide content of the beverage, withdrawing beverage from the body as required and while maintaining said pressure thereon, flowing the withdrawn beverage under pressure and over a predetermined path to a dispensing point remote from the beverage body, conducting a liquid heat absorbing medium in direct heat exchanging relation to the beverage flowing in one portion of said predetermined path, circulating the liquid medium over a closed course which includes a portion removed from said one heat exchange portion of the beverage path, and conducting a single body of liquid of the volatile refrigerant type simultaneously in direct heat exchanging relation to the beverage flowing in another portion of said predetermined path and to the liquid medium flowing in the removed portion of its closed course.

WALLACE R. KROMER.

References Cited in the file of this patent

UNITED STATES PATENTS

| Number | Name | Date |
| --- | --- | --- |
| 2,075,184 | Dolison | Mar. 30, 1937 |
| 2,129,778 | Middleton | Sept. 13, 1938 |
| 2,140,816 | Seitz | Dec. 20, 1938 |
| 2,141,221 | Panagopoulos | Dec. 27, 1938 |
| 2,278,225 | Taylor | Mar. 31, 1942 |
| 2,327,910 | Levine | Aug. 24, 1943 |